(12) United States Patent
Kurasawa et al.

(10) Patent No.: US 8,194,213 B2
(45) Date of Patent: Jun. 5, 2012

(54) LIQUID CRYSTAL DISPLAY PANEL

(75) Inventors: Hayato Kurasawa, Matsumoto (JP); Tomoaki Sekime, Azumino (JP)

(73) Assignee: Sony Corporation, Tokyo (JP)

( * ) Notice: Subject to any disclaimer, the term of this patent is extended or adjusted under 35 U.S.C. 154(b) by 193 days.

(21) Appl. No.: 12/332,790

(22) Filed: Dec. 11, 2008

(65) Prior Publication Data

US 2009/0201451 A1 Aug. 13, 2009

(30) Foreign Application Priority Data

Feb. 8, 2008 (JP) ................................. 2008-028478

(51) Int. Cl.
*G02F 1/1337* (2006.01)

(52) U.S. Cl. ......................... 349/126; 349/141; 349/144

(58) Field of Classification Search .......................... None
See application file for complete search history.

(56) References Cited

U.S. PATENT DOCUMENTS

| 6,469,765 | B1 * | 10/2002 | Matsuyama et al. | 349/143 |
| 6,710,835 | B2 * | 3/2004 | Kurahashi et al. | 349/141 |
| 2005/0030461 | A1 * | 2/2005 | Ono et al. | 349/141 |

FOREIGN PATENT DOCUMENTS

| JP | A-2002-014363 | 1/2002 |
| JP | A-2002-244158 | 8/2002 |

* cited by examiner

*Primary Examiner* — Lucy Chien
(74) *Attorney, Agent, or Firm* — K&L Gates LLP

(57) ABSTRACT

A liquid crystal display panel includes a pair of substrates opposed to each other with a liquid crystal layer interposed therebetween. In the liquid crystal display panel, a plurality of pixel areas are formed in one of the pair of substrates and each of the pixel areas is provided with an upper electrode having a plurality of slit-shaped openings, a lower electrode formed in the substrate through the upper electrode and an insulation layer, and an alignment film formed close to the liquid crystal layer. A longitudinal direction of the plurality of slit-shaped openings and a rubbing direction of the alignment film form a predetermined angle therebetween. In addition, in the lower electrode, areas where the lower electrode does not exist are formed in portions in which ends of the slit-shaped openings of the upper electrode overlap with the lower electrode in plan view.

6 Claims, 14 Drawing Sheets

LIQUID CRYSTAL DISPLAY PANEL

BACKGROUND

1. Technical Field

The present invention relates to an in-plane switching mode liquid crystal display panel, and more particularly to a fringe field switching (hereinafter, referred to as "FFS") mode liquid crystal display panel achieving a large aperture ratio, bright display, and a good characteristic obtained upon applying a force to a surface.

2. Related Art

Three electric field modes, that is, a TN (Twisted Nematic) mode, a VA (Vertical Alignment) mode, and an MVA (Multi-domain Vertical Alignment) mode are mainly used in a liquid crystal panel. An operation principle of the FFS mode liquid crystal display panel of the in-plane switching mode liquid crystal display panel in which electrodes are formed only in one substrate will be described with reference to FIGS. 11 and 12 (see JP-A-2002-14363 and JP-A-2002-244158).

FIG. 11 is a schematic plan view illustrating one pixel in a color filter substrate of the FFS mode liquid crystal display panel according to a known example. FIG. 12 is a sectional view taken along the line XII-XII of FIG. 11.

An FFS mode liquid crystal display panel 70 includes an array substrate AR and a color filter substrate CF. In the array substrate AR, a plurality of scanning lines 72 and a plurality of common lines 73 are arranged on the surface of a first transparent substrate 71 so as to be parallel to each other and a plurality of signal lines 74 are arranged so as to intersect the scanning lines 72 and the common lines 73. Counter electrodes 75 formed of a transparent conductive material such as ITO (Indium Tin Oxide) or IZO (Indium Zinc Oxide) and connected to the common lines 73 are disposed so as to cover areas defined by the scanning lines 72 and the signal lines 74. Each of pixel electrodes 78 formed of a transparent conductive material such as ITO and having a plurality of slits 77 is formed so as to have a stripe arrangement on the surface counter electrode 75 through an insulation film 76. The surfaces of the pixel electrode 78 and the plurality of slits 77 are covered with an alignment film 80.

TFTs which are switching elements are formed in the vicinity of locations where the scanning lines 72 and the signal lines 74 intersect each other. In each of the TFTs, a semiconductor layer 79 is disposed on the surface of the scanning line 72, a source electrode S is formed by extending a part of the signal line 74 so as to cover a part of the surface of the semiconductor layer 79, a portion below the semiconductor 79 forms a gate electrode G, a conductive layer overlapping with a part of the semiconductor layer 79 forms a drain electrode D, and the drain electrode D is connected to the pixel electrode 78.

The color filter substrate CF includes a color filter layer 83, an overcoat layer 84, and an alignment film 85 on the surface of a second transparent substrate 82. The array substrate AR and the color filter substrate CF are opposed to each other so that the pixel electrodes 78 and the counter electrodes 75 of the array substrate AR are opposed to the color filter layer 83 of the color filter substrate CF. Liquid crystal LC is sealed between the array substrate AR and the color filter substrate CF and polarizing plates 86 and 87 are disposed on the outside of both the array substrate AR and the color filter substrate CF, respectively, so that polarizing directions are perpendicular to each other. In this way, the FFS mode liquid crystal display panel 70 is formed.

In the FFS mode liquid crystal display panel 70, when an electric field is generated between each of the pixel electrodes 78 and each of the counter electrodes 75, the electric field is oriented from both sides of the pixel electrode 78 toward the counter electrode 75, as shown in FIG. 11. With such a configuration, not only the liquid crystal present in the slits 77 but also the liquid crystal present in each of the pixel electrodes 78 can be moved. Accordingly, the FFS mode liquid crystal display panel 70 is capable of achieving a wider viewing angle, a higher contrast, and a higher transmissivity than those of a known IPS mode liquid crystal display panel, thereby realizing bright display. Moreover, the FFS mode liquid crystal display panel 70 has an advantage of obtaining larger storage capacitance and thus not requiring an additional capacitor line, since an area where the pixel electrode 78 and the counter electrode 75 overlap with each other in plan view is larger than that in the IPS mode liquid crystal display panel.

However, in the FFS mode liquid crystal display panel and the IPS mode liquid crystal display panel, a reverse twist domain occurs in electrode ends. In addition, it is known that the area in which the reverse twist domain occurs spreads out in a test in which a force is applied to a surface and thus a ripple problem or the like occurs. A principle of the occurrence of the reverse twist domain will be described with reference to FIGS. 13A and 13B and FIGS. 14A to 14E.

FIG. 13A is a schematic expanded plan view illustrating an end of each slit-shaped opening of an upper electrode in the FFS mode liquid crystal display panel with no application of voltage. FIG. 13B is a schematic expanded plan view illustrating the end thereof with application of voltage. FIGS. 14A to 14E are diagrams illustrating an angle φ formed between a boundary direction of each slit-shaped opening and a rubbing direction Y.

In an upper electrode 91, a slit-shaped opening 92 is formed so as to be tilted in an oblique direction, for example. An insulation film is present below the slit-shaped opening 92 and a lower electrode is present below the insulation film. Under the assumption that the rubbing direction with respect to the slit-shaped opening 92 is a Y direction in FIG. 13A, liquid crystal molecules 93a are oriented in the rubbing direction with no application of voltage. When driving voltage is applied between the upper electrode 91 and the lower electrode, an electric field E is generated in a direction perpendicular to the boundary of the slit-shaped opening 92 between the upper electrode 91 and the lower electrode and the liquid crystal molecules 93a horizontally rotate by a predetermined angle θ, for example, in correspondence to the electric field E, as shown in FIG. 13B.

In this case, the directions of the electric field E on long sides 94a and 94b of the slit-shaped opening 92 are the same. However, at an end 95 of the slit-shaped opening 92, the direction of the electric field F gradually varies by 180° between one long side 94a and the other long side 94b of the slit-shaped opening 92. Therefore, an abnormal alignment area where the alignment direction of the liquid crystal molecules can rotate either rightward or leftward is present at the end 95 of the slit-shaped opening 92, when a driving voltage is applied between the upper electrode 91 and the lower electrode.

That is, as shown in FIG. 14A, under the assumption that the rubbing direction of the alignment film is Y, a longitudinal direction of the slit-shaped opening 92 of the upper electrode 91 is Z, and an angle direction of an acute angle oriented from Z to Y is positive, an acute angle φ (where φ>0°) formed between the boundary direction of the slit-shaped opening and rubbing direction Y is positive at a location A of the slit-shaped opening. The boundary direction of the slit-shaped opening and the rubbing direction Y are parallel to each other at a location B of the slit-shaped opening shown in FIG. 14B, so that φ=0°. At a location C of the slit-shaped opening shown in FIG. 14C, a direction of the acute angle φ oriented from the location C of the slit-shaped opening to the rubbing direction Y is reverse to the direction of the acute angle φ at the location A shown in FIG. 14A, so that the acute angle φ becomes negative (where φ<0°). Likewise, the acute angle φ becomes φ=±90° at a location D of the slit-shaped opening D shown in FIG. 14D. In addition, at a location E of the slit-shaped opening shown in FIG. 14E, the acute angle φ formed between the boundary direction of the slit-shaped opening and the rubbing direction Y is oriented in the same direction as that of the acute angle at the location A shown in FIG. 14A, so that the acute angle φ is positive (where φ>0°).

Accordingly, the end 95 of the slit-shaped opening 92 includes the abnormal alignment area where the alignment direction of the liquid crystal molecules can rotate either rightward or leftward between the location B shown in FIG. 14B and the location D shown in FIG. 14D, when the driving voltage is applied between the upper electrode 91 and the lower electrode. This abnormal alignment area of the end 95 of the slit-shaped opening 92 is called the reverse twist domain. In the known FFS mode liquid crystal display panel, since an image cannot be displayed in the reverse twist domain, the reverse twist domain is generally shielded by a light-shielding member. However, when the reverse twist domain is shielded by the light-shielding member, a decrease in aperture ratio occurs.

SUMMARY

An advantage of some aspects of the invention is that it provides an FFS mode liquid crystal display panel capable of achieving a large aperture ratio, bright display, and a good characteristic obtained upon applying a force to a surface.

According to an aspect of the invention, there is provided a liquid crystal display panel which includes a pair of substrates opposed to each other with a liquid crystal layer interposed therebetween and in which a plurality of pixel areas are formed in one of the pair of substrates and each of the pixel areas is provided with an upper electrode having a plurality of slit-shaped openings, a lower electrode formed in the substrate through the upper electrode and an insulation layer, and an alignment film formed close to the liquid crystal layer. A longitudinal direction of the plurality of slit-shaped openings and a rubbing direction of the alignment film form a predetermined angle. In the lower electrode, areas where the lower electrode does not exist are formed in portions in which ends of the slit-shaped openings of the upper electrode overlap with the lower electrode in plan view.

The liquid crystal display panel according to the aspect of the invention includes the pair of substrates opposed to each other with the liquid crystal layer interposed therebetween and in which the plurality of pixel areas are formed in one of the pair of substrates and each of the pixel areas is provided with the upper electrode having the plurality of slit-shaped openings, the lower electrode formed in the substrate through the upper electrode and the insulation layer, and the alignment film formed close to the liquid crystal layer. With such a configuration, the liquid crystal display panel according to the aspect of the invention operates in an FFS mode. In the liquid crystal display panel according to the aspect of the invention, the longitudinal direction of the plurality of slit-shaped openings and the rubbing direction of the alignment film form the predetermined angle. In this way, when the predetermined angle is formed with the rubbing direction of the alignment film, the FFS mode liquid crystal display panel with a good display image quality can be obtained.

According to the liquid crystal display panel according to the aspect of the invention, in the lower electrode, the areas where the lower electrode does not exist are formed in the portions in which the ends of the slit-shaped openings of the upper electrode overlap with the lower electrode in plan view. In the areas where the lower electrode does not exist, an electric field applied to liquid crystal molecules becomes very weak, even when driving voltage is applied between the upper electrode and the lower electrode. Therefore, the liquid crystal molecules are hardly driven with the alignment direction controlled by the first alignment film. Accordingly, light from the backlight unit are not actually transmitted in the areas where the lower electrode does not exist. In contrast, in areas where the lower electrode exists, the liquid crystal molecules horizontally rotate only by a predetermined angle θ, for example, with respect to an initial alignment direction, thereby transmitting the light from the backlight unit. Then, in the liquid crystal display panel according to the aspect of the invention, the alignment direction of the liquid crystal molecules is deviated by the angle θ in the areas where the lower electrode does not exist and the areas where the lower electrode exists, when the driving voltage is applied between the upper electrode and the lower electrode.

However, like a known example, when areas where the lower electrode does not exist are not formed in portions where the ends of the slit-shaped openings of the upper electrode overlap with the lower electrode in plan view, the direction of the electric field gradually varies by 180° between one long side and the other long side of the slit-shaped opening. For that reason, an area where the liquid crystal molecules can horizontally rotate either rightward or leftward, that is, a reverse twist domain is present. However, in the liquid crystal display panel according to the aspect of the invention, the liquid crystal molecules are not actually driven in the areas where the lower electrode do not exist, even when the driving voltage is applied between the upper electrode and the lower electrode. Accordingly, it is difficult for the reverse twist domain occurring in the known example to occur. Moreover, even when reverse twist occurs in the liquid crystal display panel according to the aspect of the invention, a domain in an original twist direction is suppressed, thereby considerably reducing the reverse twist domain.

In the known FFS mode liquid crystal display panel, since the ends of the slit-shaped openings of the upper electrode are shielded by a light-shielding film an area of shielded portions is large and an aperture ratio is considerably reduced. However, in the liquid crystal display panel according to the aspect of the invention, it is not necessary to shield the ends of the slit-shaped opening of the upper electrode, since the light from the backlight unit is not transmitted in the portions in which the areas where the lower electrode does not exist in the lower electrode. Accordingly, it is possible to considerably improve the aperture ratio. According to the liquid crystal display panel according to the aspect of the invention, it is possible to obtain the FFS mode liquid crystal display panel capable of achieving a large aperture ratio and a good characteristic obtained upon applying a force to a surface.

In the liquid crystal display panel according to the aspect of the invention, under the assumption that an angle direction of an acute angle formed between the longitudinal direction of the slit-shaped opening and the rubbing direction is positive, the areas where the lower electrode does not exist may be located in portions in which an angle φ (where $0°≦|φ|≦90°$) formed between a boundary direction of the slit-shaped opening and the rubbing direction is negative.

In the known FFS mode liquid crystal display panel, under the assumption that the angle direction of the acute angle formed between the longitudinal direction of the slit-shaped opening and the rubbing direction is positive, the liquid crystal molecules easily rotate either rightward or leftward in portions in which the angle $\phi$ (where $0°\leq|\phi|\leq 90°$) formed between the boundary direction of the slit-shaped opening and the rubbing direction is negative. Therefore, it is easy for abnormal alignment to occur. In order to solve this problem, in the liquid crystal display panel according to the aspect of the invention, the areas where the lower electrode does not exist which does not transmit the light from the backlight unit are formed in miniature only in the portions in which the abnormal alignment easy occurs. Accordingly, it is possible to realize the liquid crystal display panel capable of making more bright display.

In the liquid crystal display panel according to the aspect of the invention, the areas where the lower electrode does not exist may be formed as notches formed in side edges of the lower electrode.

When the areas where the lower electrode does not exist are formed by the photolithographic method, a method of extending the notches a part of which are opened from the outer circumference of the lower electrode is better than a method of forming openings with a closed circumference within the lower electrode since flexibility of mask alignment is larger. Accordingly, according to the liquid crystal display panel according to the aspect of the invention, easy manufacture is possible.

In the liquid crystal display panel according to the aspect of the invention, the areas where the lower electrode does not exist may be formed as openings formed in the lower electrode.

By allowing the areas where the lower electrode does not exist to be opened, it is possible to form the areas, where the lower electrode does not exist, overlapping with the slit-shaped openings of the upper electrode in plan view, even when the ends of the slit-shaped openings of the upper electrode are present at any location in a pixel. Therefore, according to the liquid crystal display panel according to the aspect of the invention, the areas where the lower electrode does not exist easily overlap with the openings of the lower electrode in plan view, even when the areas where the lower electrode does not exist are small. Accordingly, it is possible to realize the liquid crystal display panel capable of making more bright display.

In the liquid crystal display panel according to the aspect of the invention, the ends of the slit-shaped openings of the upper electrode may be formed at an acute angle.

Since the ends of the slit-shaped openings of the upper electrode formed at the acute become a base point of the reverse twist domain, the reverse twist domain can be made smaller. Accordingly, it is possible to reduce an influence on a display image quality and allow the notches formed in the lower electrode which does not transmit the light from the backlight unit to be small, thereby realizing the liquid crystal display panel capable of making more bright display. Moreover, the ends of the slit-shaped openings of the upper electrode formed at the acute angle easily overlap with the notches of the lower electrode in plan view, even when the notches of the lower electrode are small. Accordingly, it is possible to realize the liquid crystal display panel capable of making more bright display.

In the liquid crystal display panel according to the aspect of the invention, the lower electrode may be formed on the surface of a flattened film formed in each of pixels.

When a flattened film is formed in every pixel, each electrode formed on the surface of the flattened film is flattened since the unevenness caused due to a switching element or the like is uniformly flattened and thus a cell gap is uniformed. Accordingly, according to the liquid crystal display panel according to the aspect of the invention, it is possible to obtain a liquid crystal display panel having a good display image quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
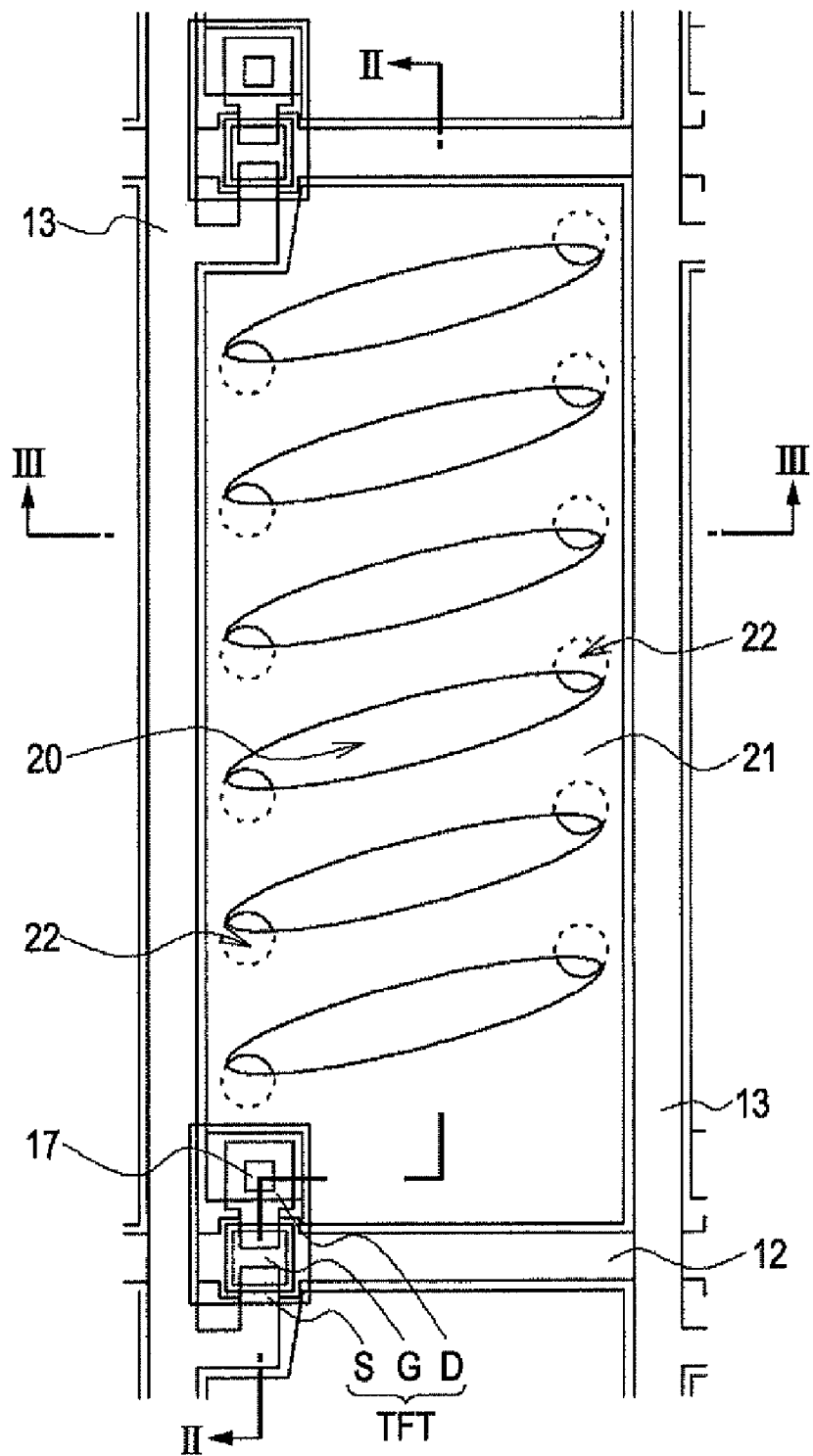
FIG. 1 is a schematic plan view illustrating one pixel in a color filter substrate of a liquid crystal display panel according to a first embodiment.

Hereinafter, exemplary embodiments of the invention will be described with reference to the drawings. In the exemplary embodiment described below, it should be understood that a liquid crystal display panel is an exemplary device realizing the technical idea of the invention and is not to be considered as limiting. Other embodiments without departing from the claims are also put into practice. In the drawings for the description of the specification, the scales of layers or members are different from and not necessarily proportional to the actual sizes thereof for the purpose of easily recognizing the layers and the members in the drawings.

Figure 2:
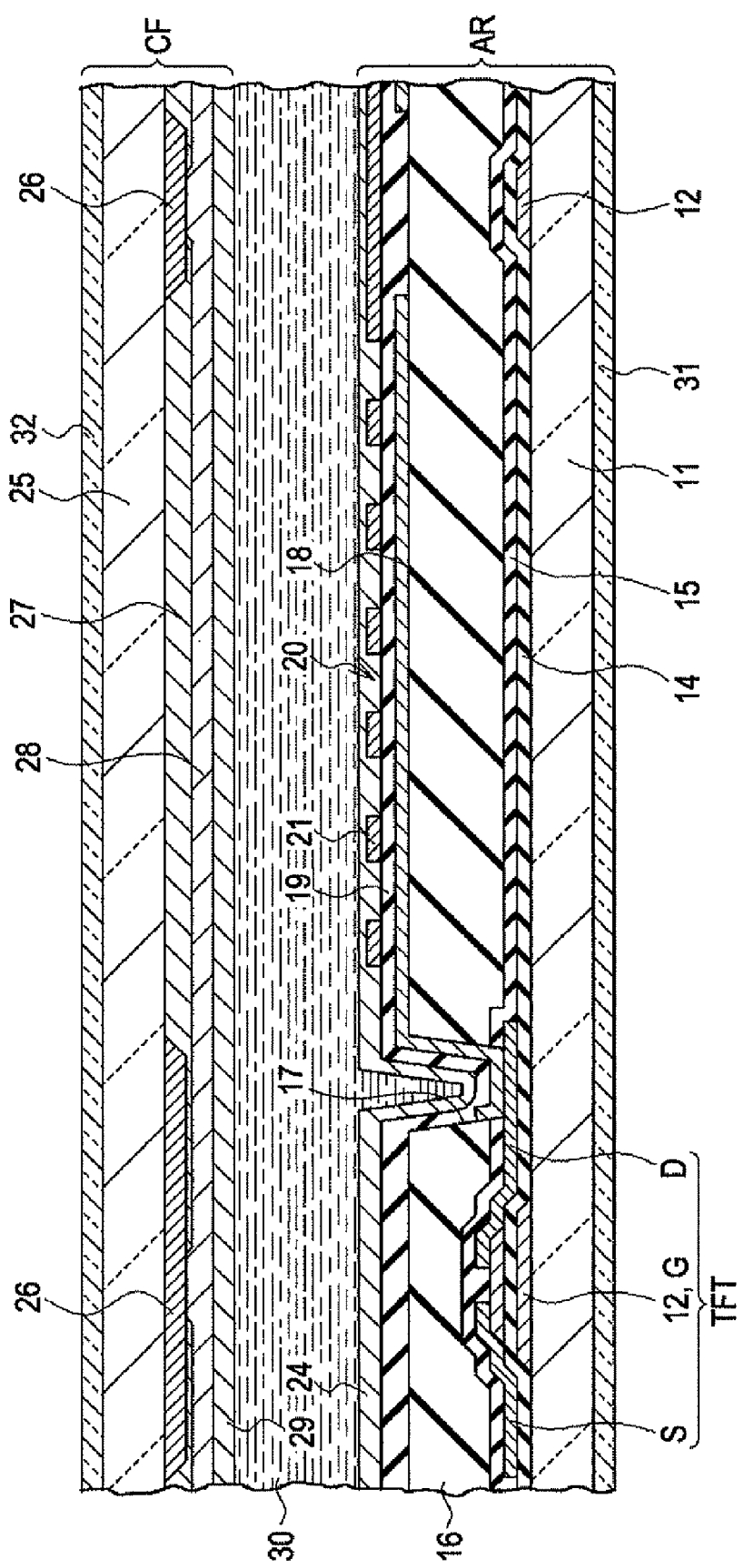
FIG. 2 is a sectional view taken along the line II-II of FIG. 1.
Figure 3:
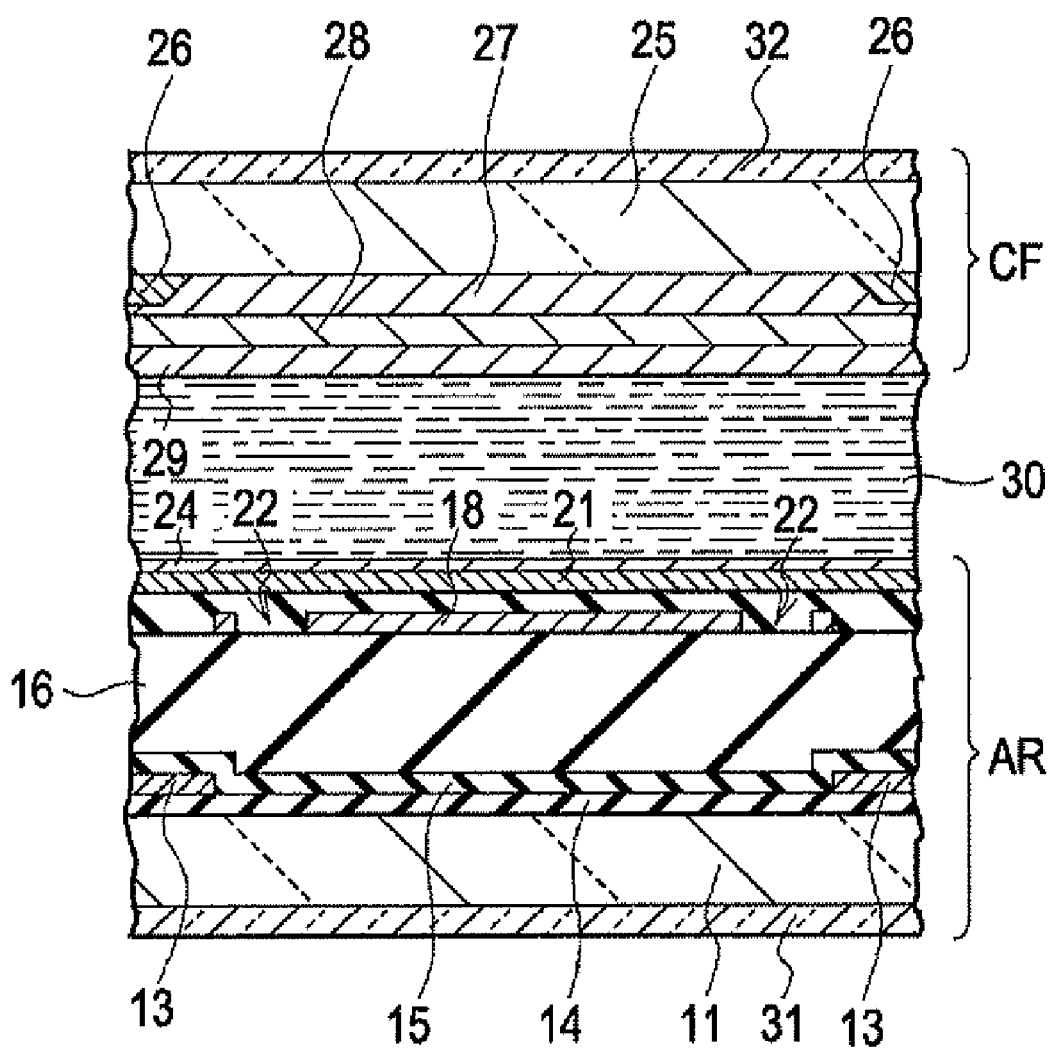
FIG. 3 is a sectional view taken along the line III-III of FIG. 1.
Figure 4A:
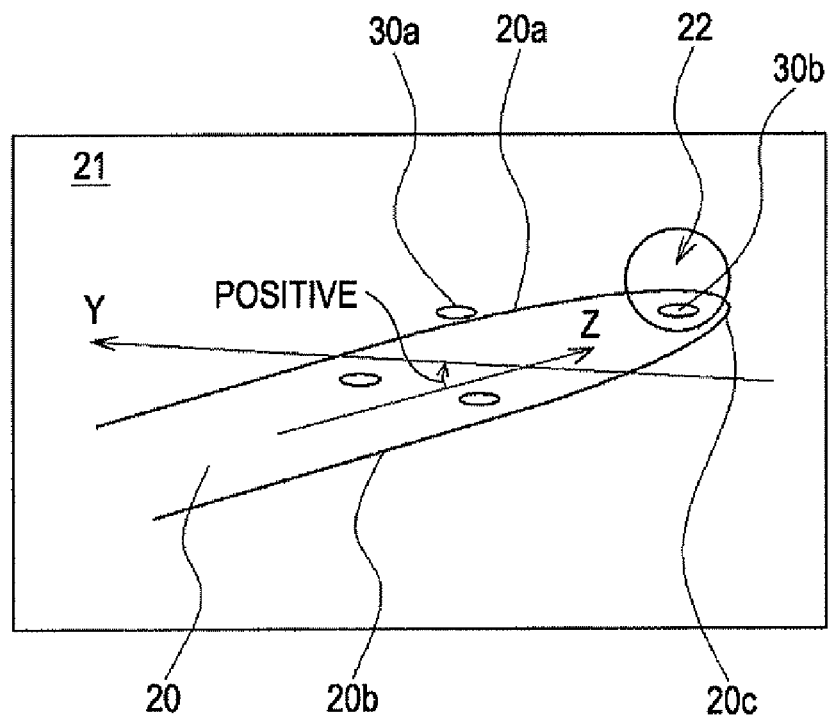
FIG. 4A is a schematic expanded plan view illustrating an end of one slit-shaped opening of an upper electrode in the liquid crystal display panel with no application of voltage according to the first embodiment.
Figure 4B:
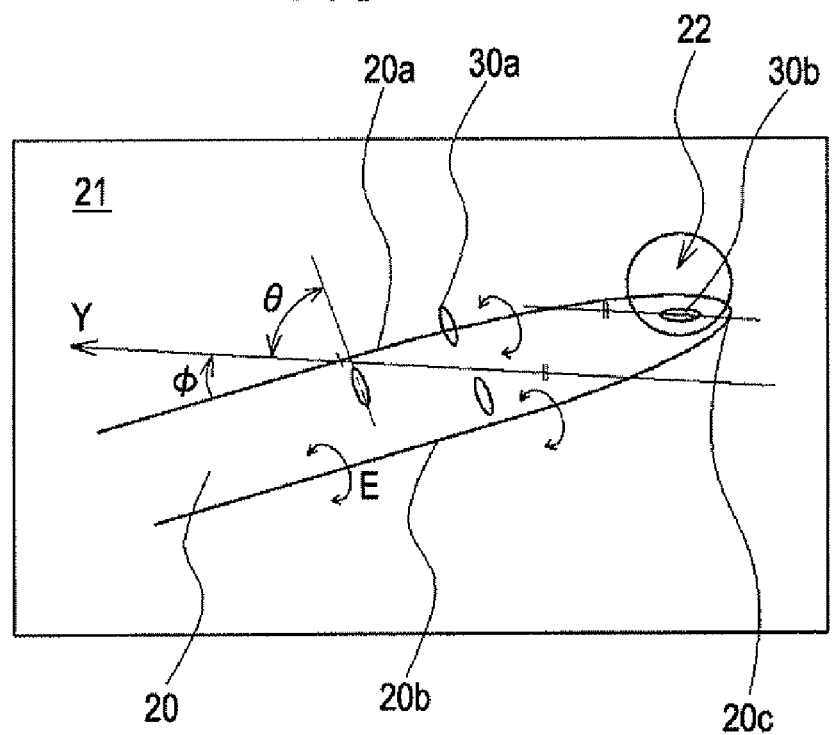
FIG. 4B is a schematic expanded plan view illustrating the end thereof with application of voltage.
Figure 5:
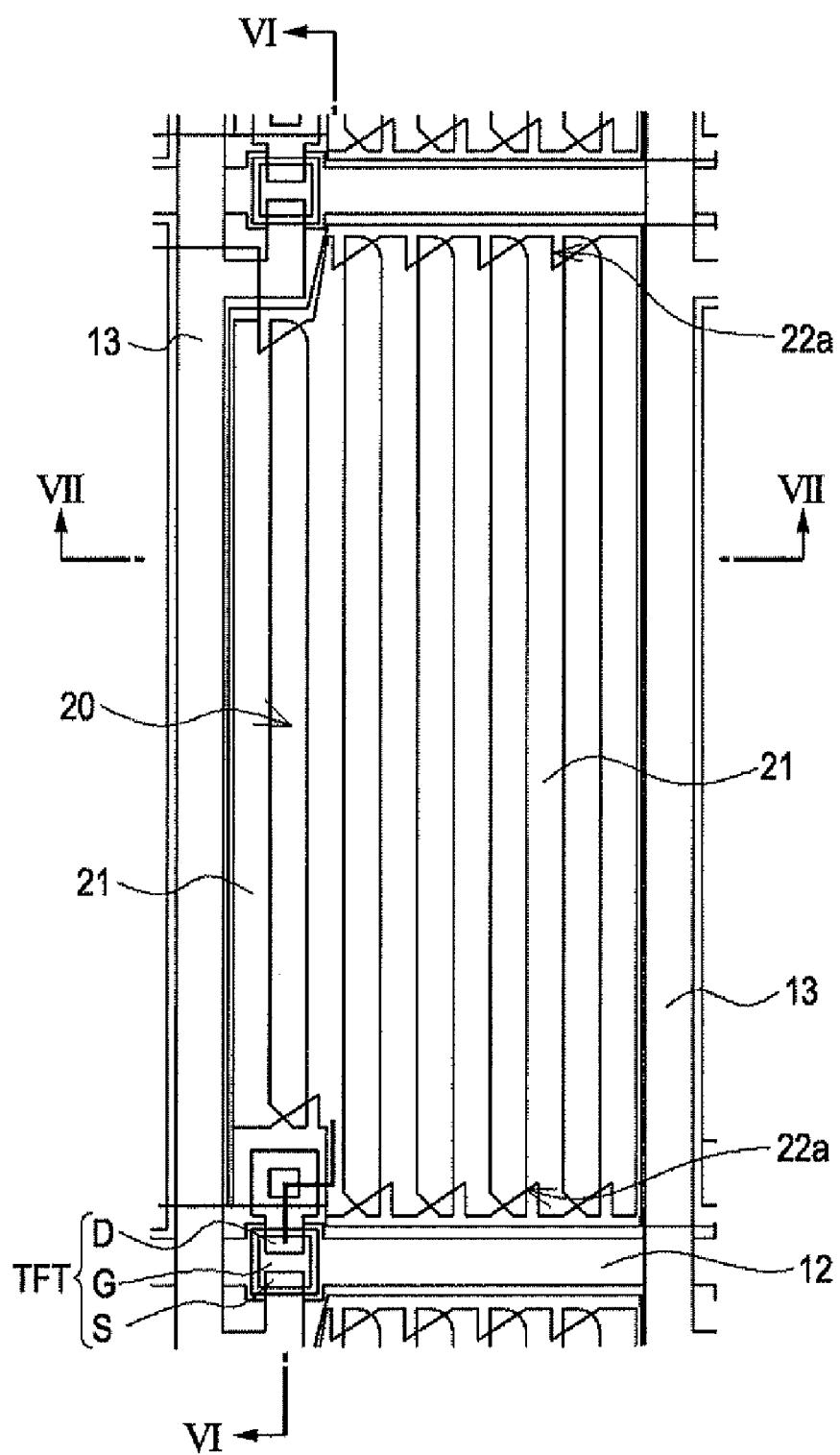
FIG. 5 is a schematic plan view illustrating one pixel in a color filter substrate of a liquid crystal display panel according to a second embodiment.
Figure 6:
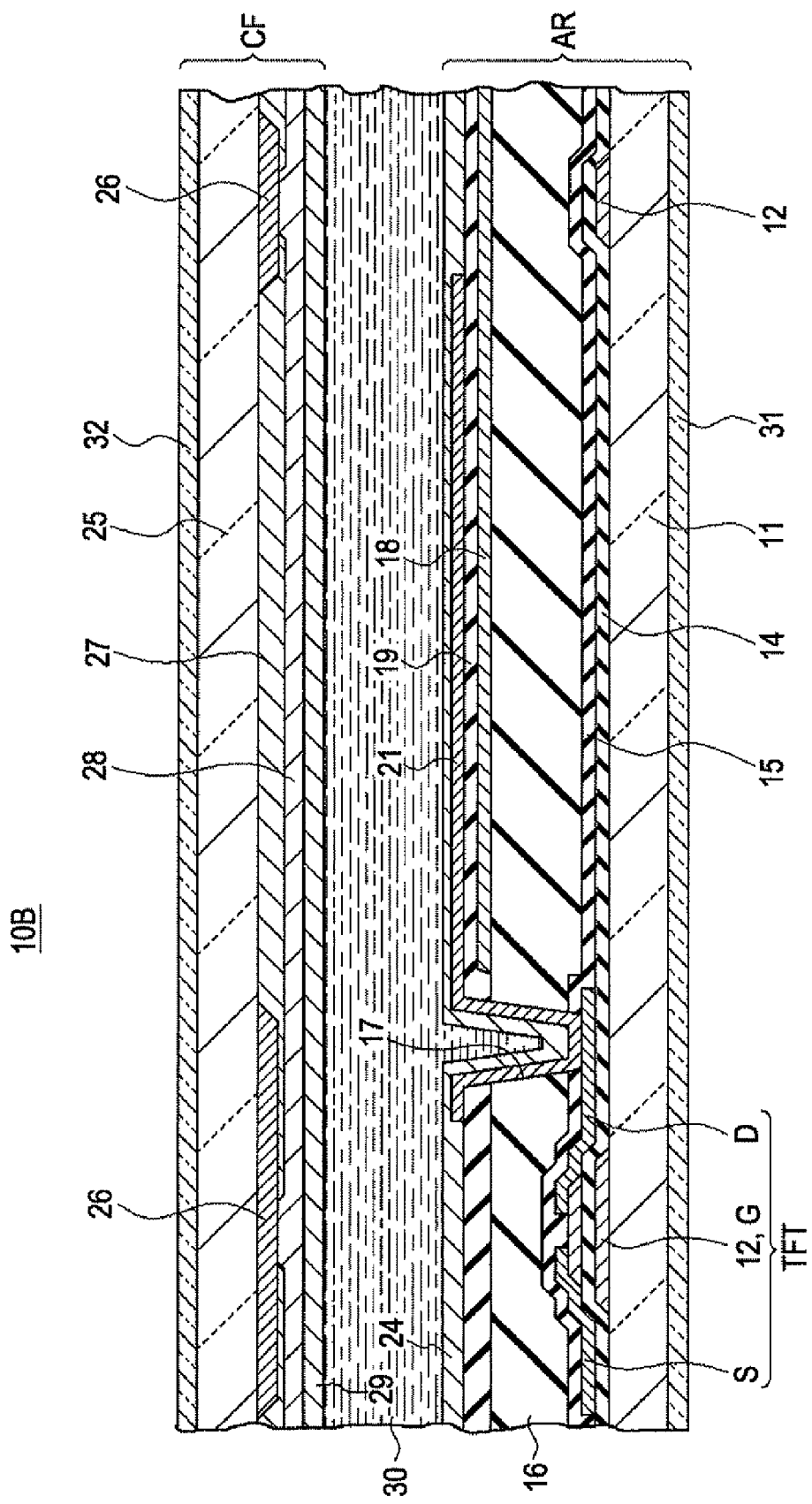
FIG. 6 is a sectional view taken along the line VI-VI of FIG. 5.
Figure 7:
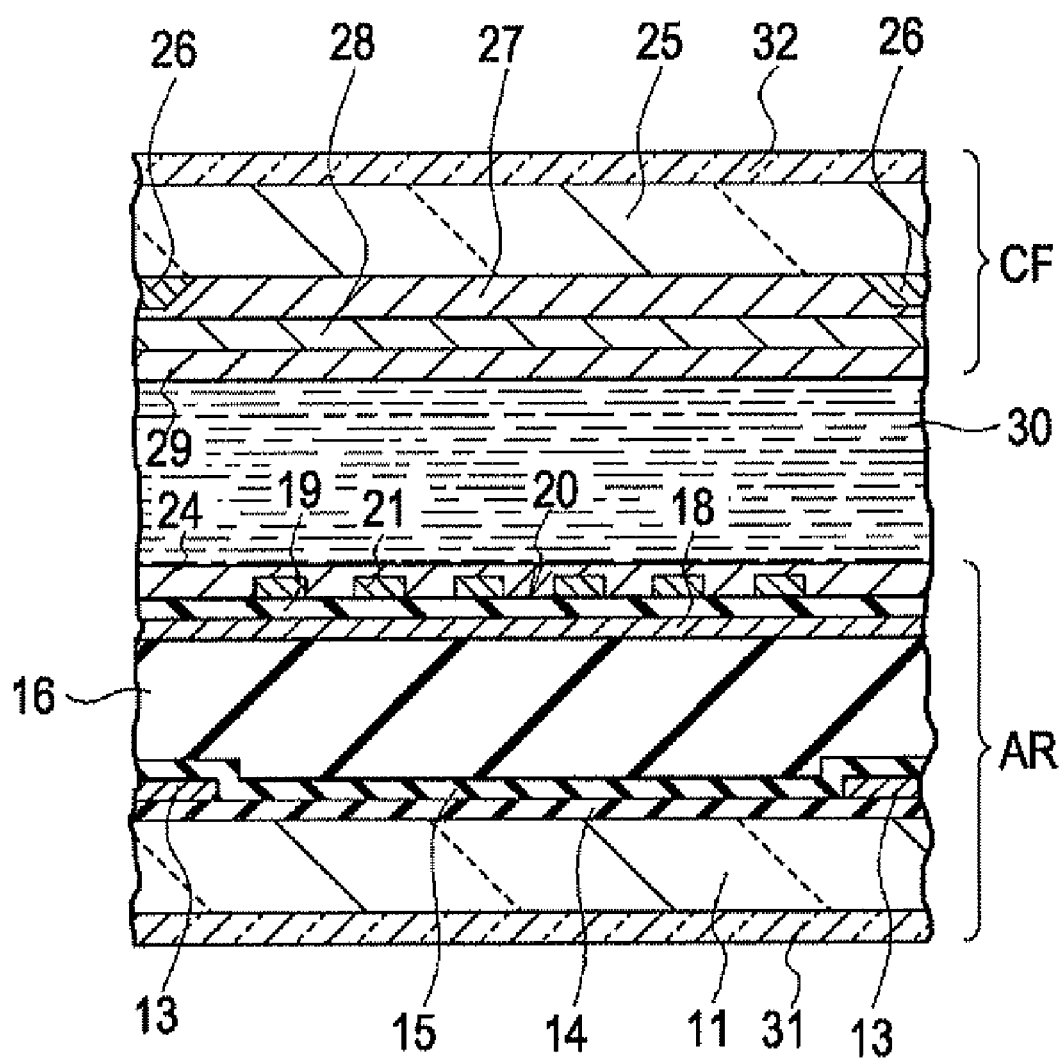
FIG. 7 is a sectional view taken along the line VII-VII of FIG. 5.
Figure 8:
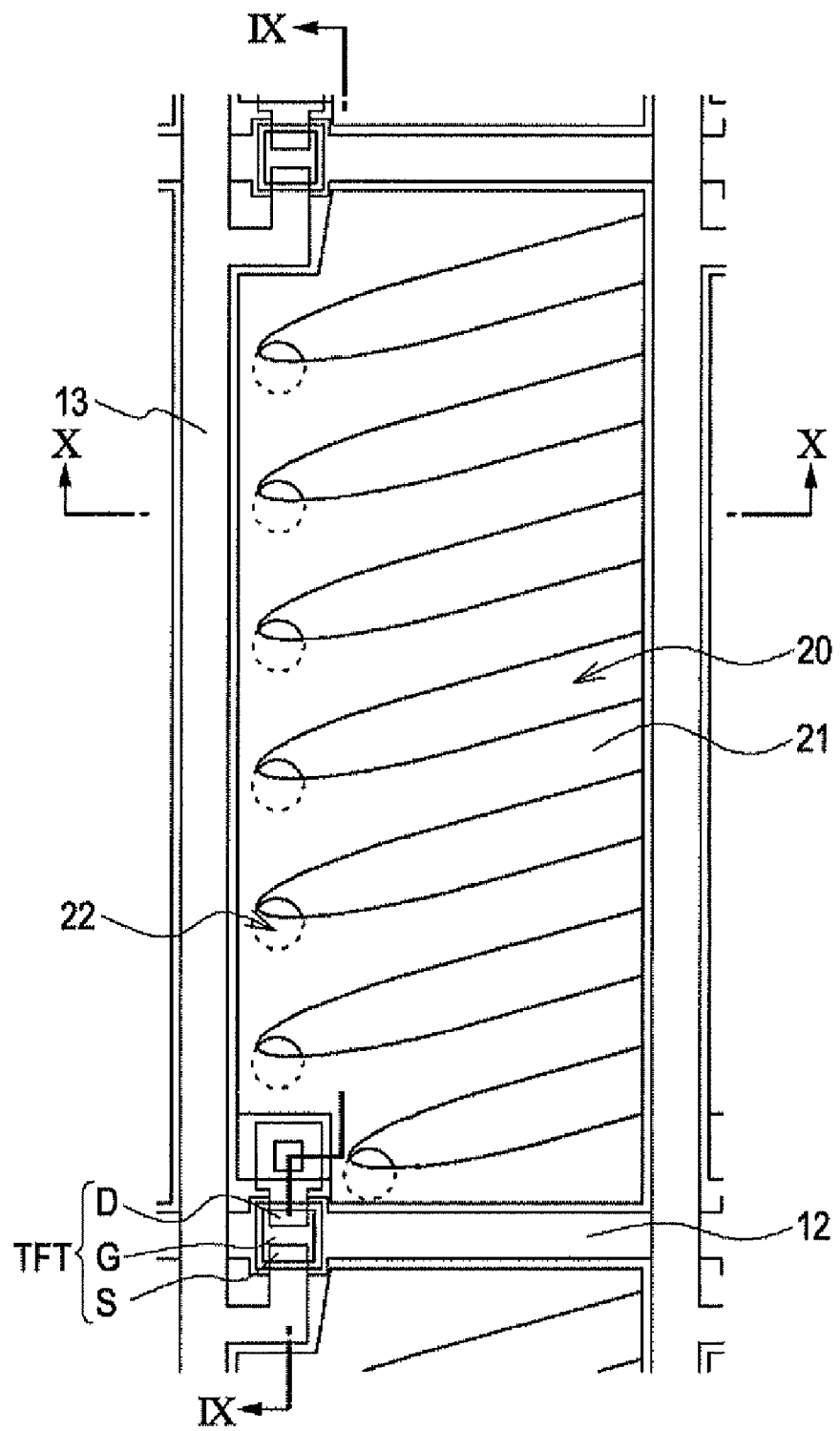
FIG. 8 is a schematic plan view illustrating one pixel in a color filter substrate of a liquid crystal display panel according to a third embodiment.
Figure 9:
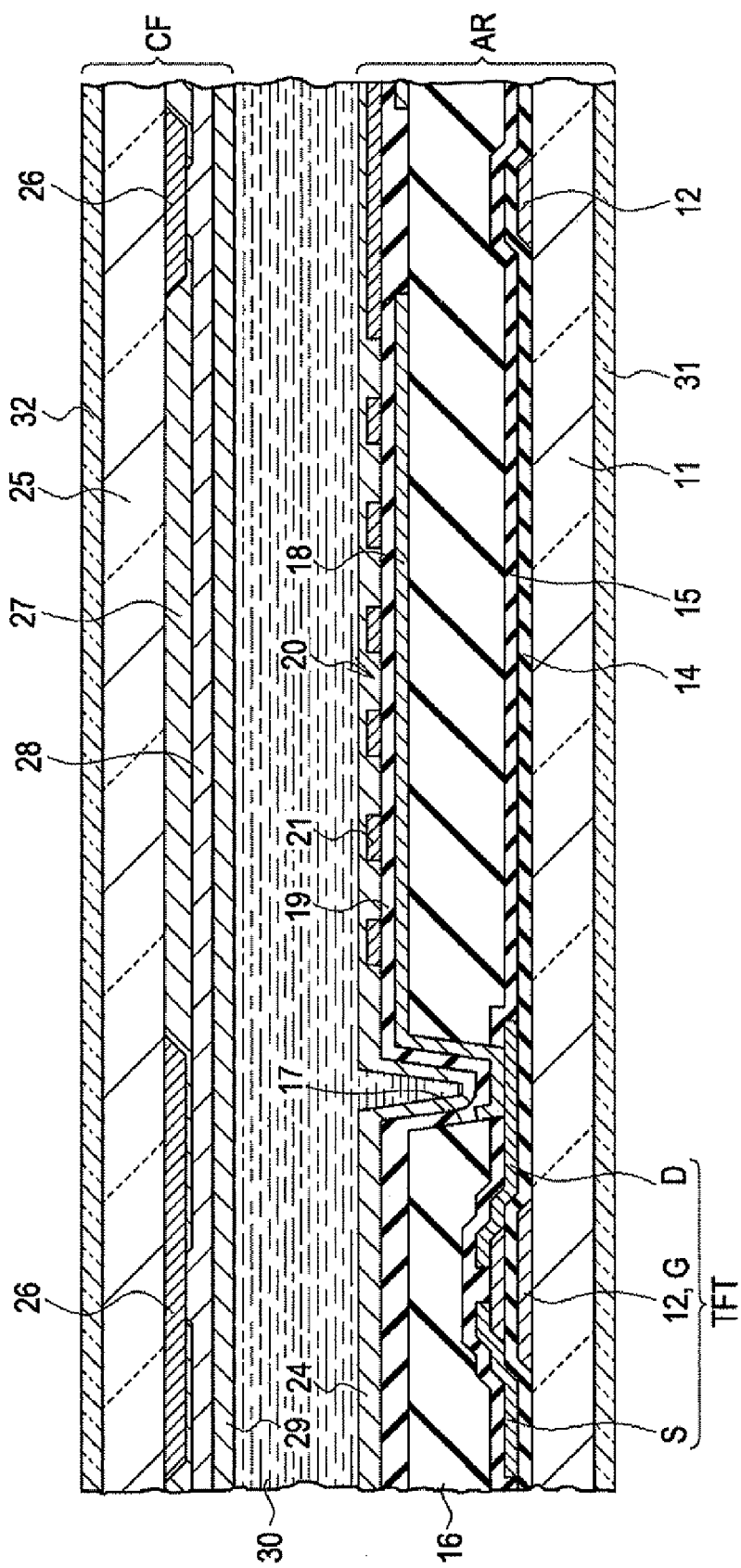
FIG. 9 is a sectional view taken along the line IX-IX of FIG. 8.
Figure 10:
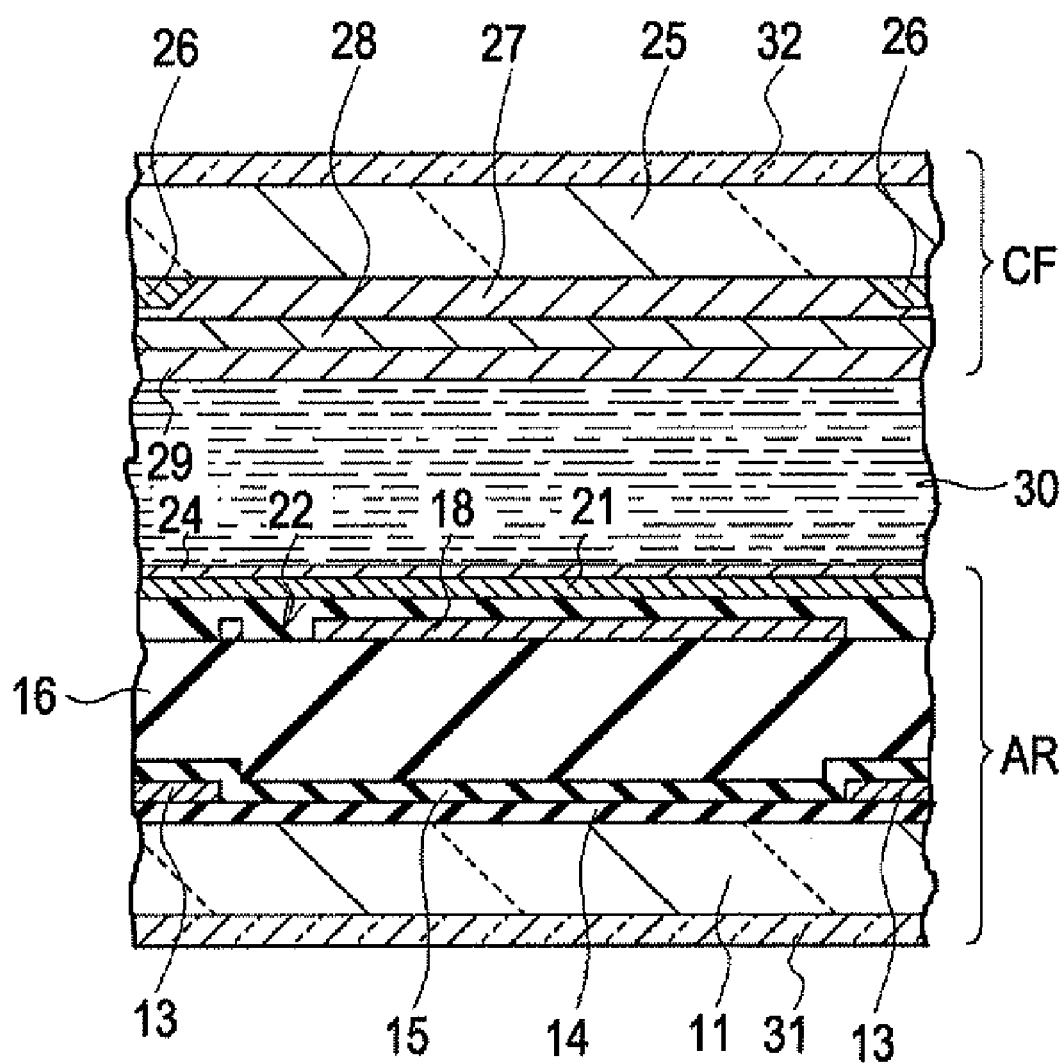
FIG. 10 is a sectional view taken along the line X-X of FIG. 8.
Figure 11:
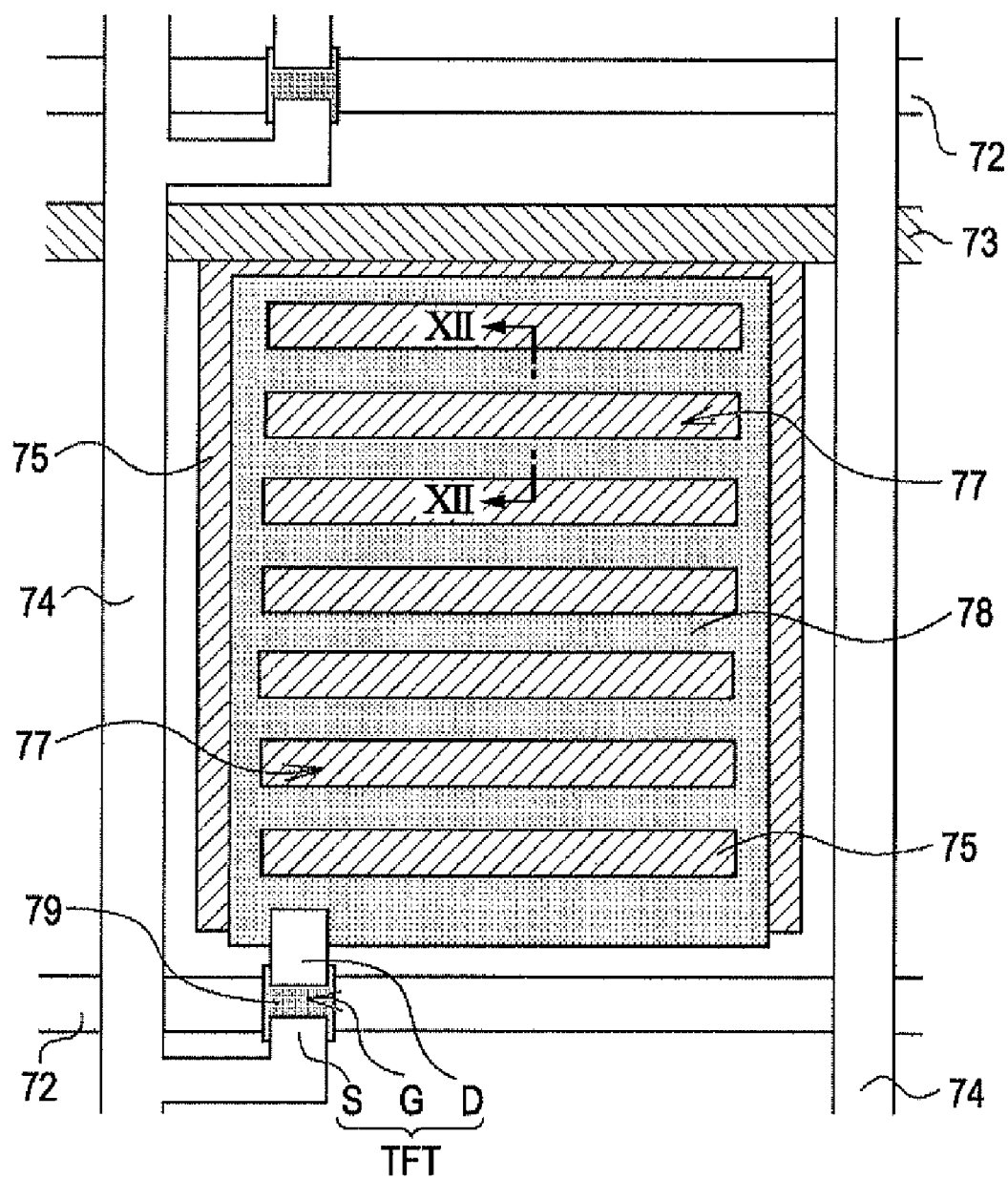
FIG. 11 is a schematic plan view illustrating one pixel in a color filter substrate of a liquid crystal display panel according to a known example.
Figure 12:
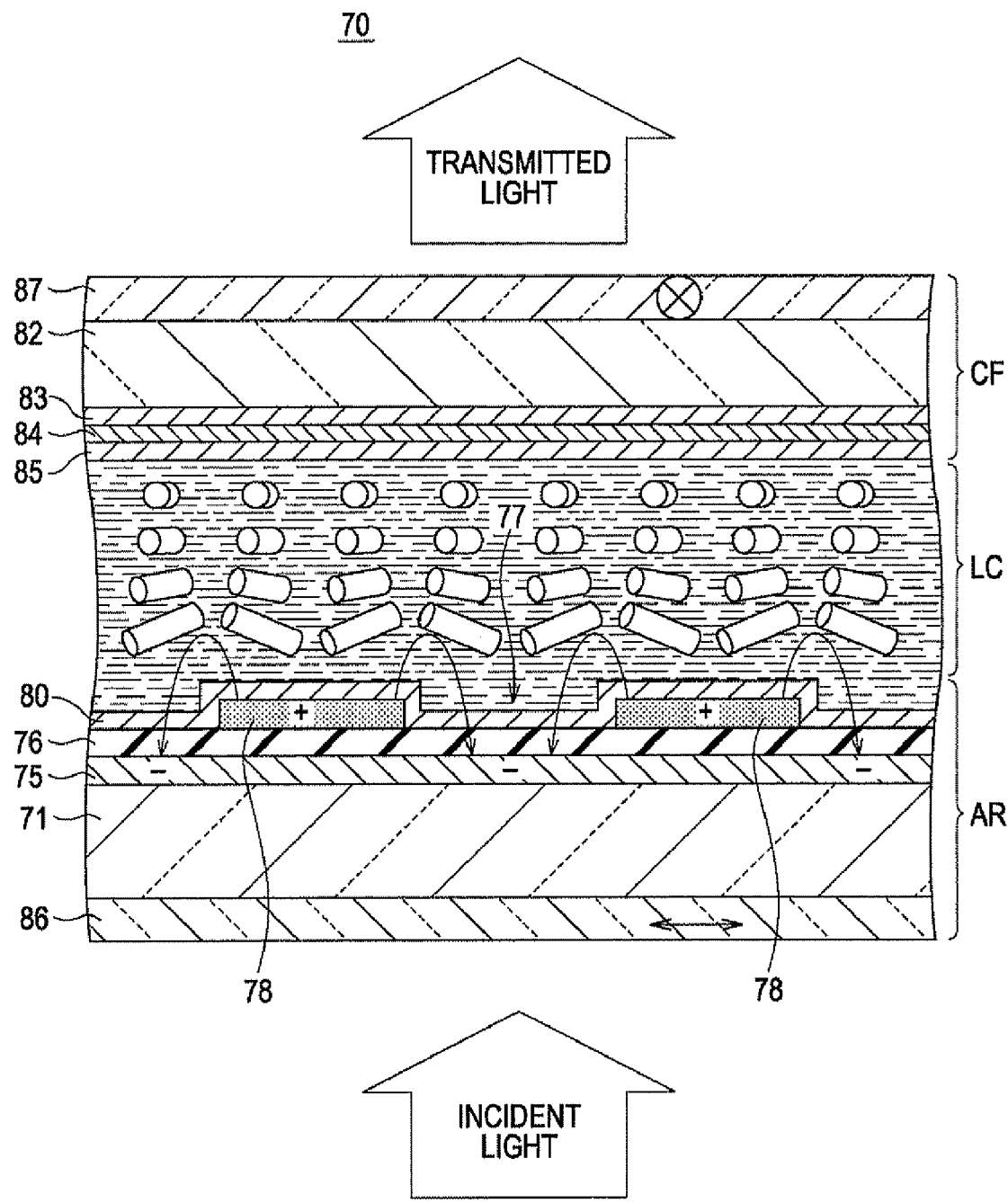
FIG. 12 is a sectional view taken along the line XII-XII of FIG. 11.
Figure 13A:
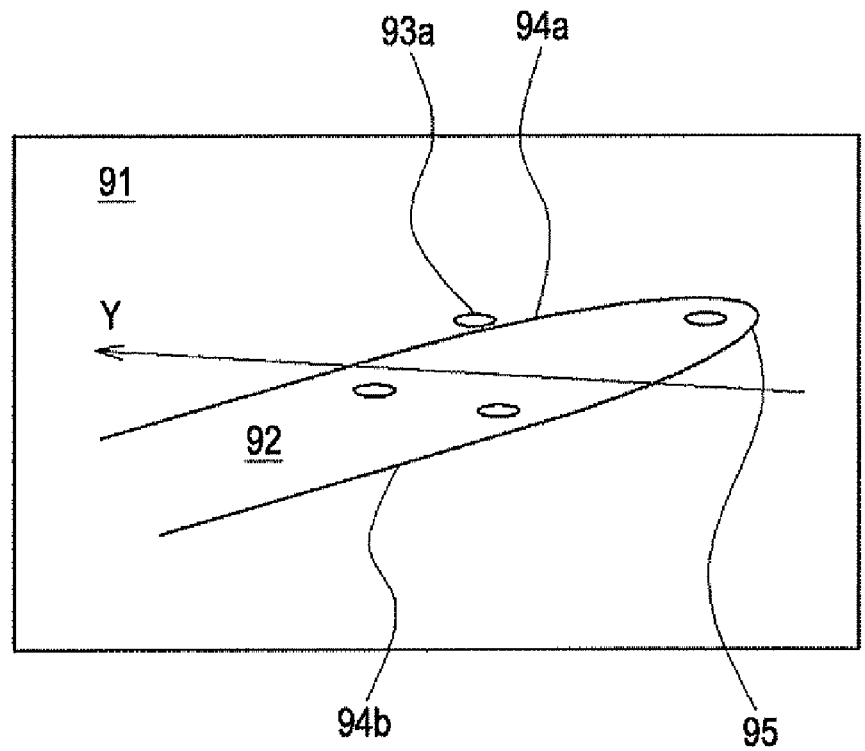
FIG. 13A is a schematic expanded plan view illustrating an end of a slit-shaped opening of an upper electrode in an FFS mode liquid crystal display panel with no application of voltage.
Figure 13B:
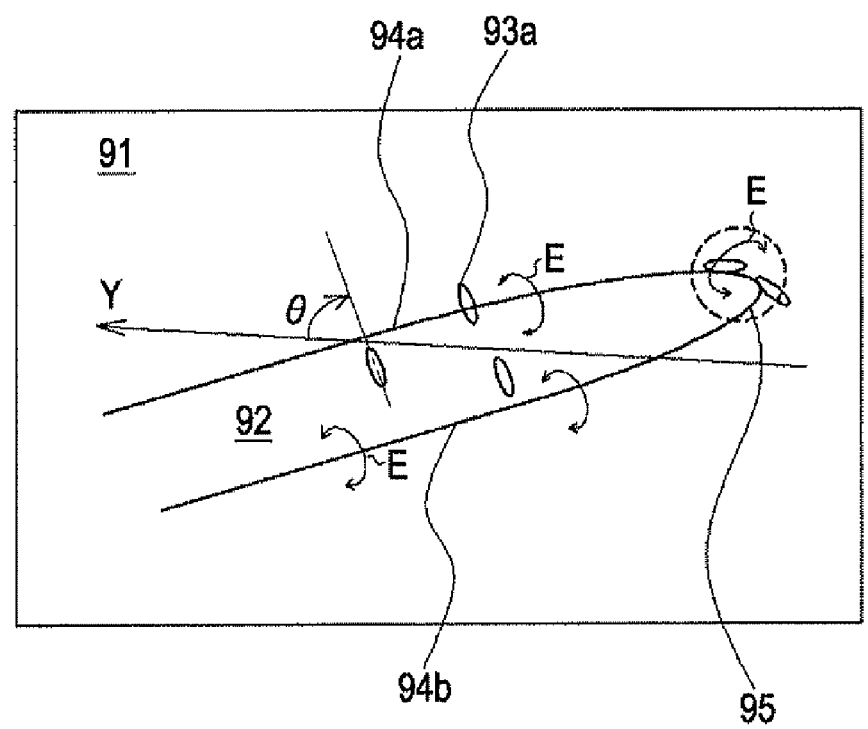
FIG. 13B is a schematic expanded plan view illustrating the end thereof with application of voltage.
Figure 14A:
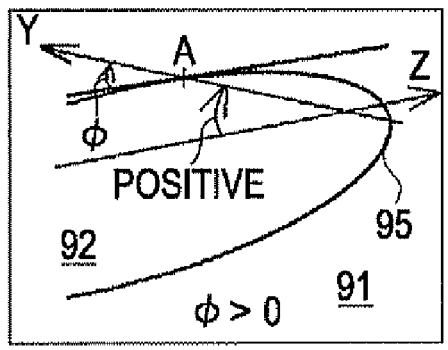
FIGS. 14A to 14E are diagrams illustrating an angle $\phi$ formed between a boundary direction of each slit-shaped opening and a rubbing direction Y.
Figure 14B:
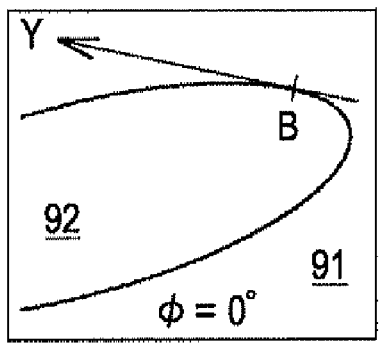
Figure 14C:
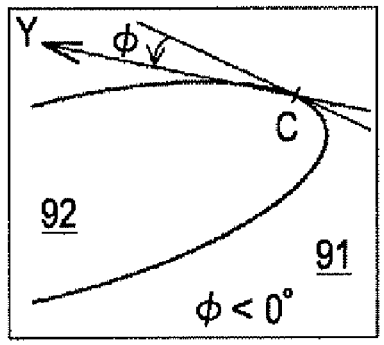
Figure 14D:
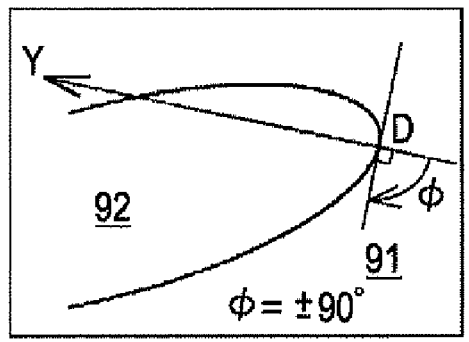
Figure 14E:
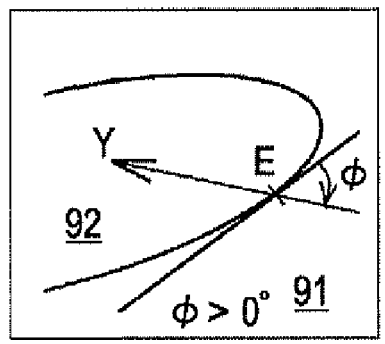

FIG. 1 is a schematic plan view illustrating one pixel in a color filter substrate of a liquid crystal display panel according to a first embodiment. FIG. 2 is a sectional view taken along the line II-II of FIG. 1. FIG. 3 is a sectional view taken along the line III-III of FIG. 1. FIG. 4A is a schematic expanded plan view illustrating an end of one slit-shaped opening of an upper electrode in the liquid crystal display panel with no application of voltage according to the first embodiment, FIG. 4B is a schematic expanded plan view illustrating the end thereof with application of voltage. FIG. 5 is a schematic plan view illustrating one pixel in the color filter substrate of the liquid crystal display panel according to a second embodiment. FIG. 6 is a sectional view taken along the line VI-VI of FIG. 5. FIG. 7 is a sectional view taken along the line VII-VII of FIG. 5. FIG. 8 is a schematic plan view illustrating one pixel in the color filter substrate of the liquid crystal display panel according to a third embodiment, FIG. 9 is a sectional view taken along the line IX-IX of FIG. 8. FIG. 10 is a sectional view taken along the line X-X of FIG. 8.

First Embodiment

According to the first embodiment, a liquid crystal display panel 10A includes an array substrate AR and a color filter substrate CF. In the array substrate AR, a plurality of scanning lines 12 and signal lines 13 intersect each other on the surfaces of display areas of a first transparent substrate 11 such as a glass substrate in a state where the scanning lines 12 and the signal lines 13 are insulated from each other by a gate insulation film 14. Moreover, common lines (not shown) are formed in the edges of the display areas, Pixels (also referred to as "sub-pixels") are formed in areas surrounded by individual scanning lines 12 and individual signal lines 13. On the first transparent substrate 11, a switching element such as a TFT is formed in each of the pixels, and a passivation film 15 formed of a silicon nitride layer or a silicon oxide layer is coated across the entire surface of the first transparent substrate 11 including the TFTs.

A flattened film 16 formed of an organic material is formed on the surface of the passivation film 15. Contact holes 17 are formed at locations corresponding to drain electrodes D of the TFTs in the passivation film 15 and the flattened film 16. On the surface of the flattened film 16, a lower electrode 18 formed of a transparent conductive material such as ITO or IZO is formed in each of the pixel areas, and the lower electrode 18 is electrically connected to the drain electrode D of the TFT through the contact hole 17. With such a configuration, the lower electrode 18 serves as a pixel electrode in the liquid crystal display panel 10A according to the first embodiment.

In the lower electrode 18, areas 22, where the lower electrode 18 does not exist, having a shape of a circle are formed in portions overlapping with the ends of slit-shaped openings 20 of the upper electrode 21 described below in plan view. The areas 22 where the lower electrode 18 does not exist will be described in detail below. An insulation film 19 formed of a silicon nitride layer or a silicon oxide layer is formed across the entire surface of the first transparent substrate 11 in which the lower electrode 18 is formed. On the insulation film 19, the upper electrode 21 having the plurality of slit-shaped openings 20 arranged parallel to each other is formed entirely in each of the pixels. The upper electrode 21 formed of a transparent conductive material such as ITO or IZO is electrically connected to the common line (not shown) in the edge of the display area. With such a configuration, the upper electrode 21 serves as a counter electrode in the liquid crystal display panel 10A according to the first embodiment. Moreover, either the lower electrode 18 or the upper electrode 21 can be connected to the drain electrode D of the TFT or the common line.

As shown in FIGS. 2 and 3, the color filter substrate CF is provided with light-shielding films 26 on the surface of a second transparent substrate 25 such as a glass substrate so as to cover locations corresponding to the scanning lines 12, the signal lines 13, the contact holes 17, and the TFTs. Color filter layers 27 each having a predetermined color are formed on the surface of the second transparent substrate 25 surrounded by the light-shielding films 26. An overcoat layer 28 is formed so as to cover the surfaces of the light-shielding films 26 and the color filter layers 27. A second alignment film 29 is formed on the surface of the overcoat layer 28. A rubbing direction of the alignment film of the color filter substrate CF and a rubbing direction of the alignment film of the array substrate AR are the same in plan view, but are tilted by about 5° to 10° with respect to a slit 17 formed in the upper electrode 21.

The array substrate AR and the color filter substrate CF are opposed to each other with a liquid crystal layer 30 interposed therebetween so that the lower electrodes 18 and the upper electrodes 21 of the array substrate AR are opposed to the light-shielding films 26 of the color filter substrate CF. A first polarizing plate 31 and a backlight unit (not shown) are disposed outside the array substrate AR and a second polarizing plate 32 is disposed outside the color filter substrate CF. In this way, the liquid crystal display panel 10A according to the first embodiment is formed.

Here, the areas 22, where the lower electrode 18 does not exist, formed in the lower electrode 18 of the liquid crystal display panel 10A according to the first embodiment will be described with reference to FIGS. 4A and 4B. In each of the upper electrodes 21, the slit-shaped openings 20 are formed in an inclination direction, for example. Under the assumption that a rubbing direction with respect to the slit-shaped openings 20 is a Y direction in FIG. 4A, liquid crystal molecules 30a are parallel to the rubbing direction with no application of voltage, as shown in FIG. 4A. At this time, when driving voltage is applied between the upper electrode 21 and the lower electrode 18, an electric field E is generated in a direction perpendicular to the boundary of the slit-shaped openings 20 between the upper electrode 21 and the lower electrode 18, and the liquid crystal molecules 30a horizontally rotate only by a predetermined angle θ with respect to the electric field E, as shown in FIG. 4B.

The directions of the electric field E on long sides 20a and 20b of the slit-shaped opening 20 are the same. However, at an end 20c of the slit-shaped opening 20, the direction of the electric field E gradually varies by 180° between one long side 20a and the other long side 20b of the slit-shaped opening 20. Therefore, in a known FFS mode liquid crystal display panel, an area where the liquid crystal molecules can rotate either rightward or leftward is present in the end 20c of the slit-shaped opening 20, when the driving voltage is applied between the upper electrode 21 and the lower electrode 18.

In the liquid crystal display panel 10A according to the first embodiment, the areas 22, where the lower electrode 18 does not exist, having the shape of a circle are formed in the lower electrode 18 of portions overlapping with the ends 20c of slit-shaped openings 20 of the upper electrode 21 in plan view. The electric field applied to the liquid crystal molecules 30b is very weak in the portions in which the areas 22 where the lower electrode 18 does not exist are formed, even when the driving voltage is applied between the upper electrode 21 and the lower electrode 18. Therefore, as shown in FIG. 4B, the liquid crystal molecules 30b are negligibly driven with the alignment direction controlled by the first alignment film 24 and light from the backlight unit is not actually transmitted.

On the other hand, in areas where the lower electrode 18 exists, the liquid crystal molecules horizontally rotate only by the angle θ, for example, with respect to an initial alignment direction shown in FIG. 4A and allow the light from the backlight unit to be transmitted, when the driving voltage is applied between the upper electrode 21 and the lower electrode 18. In the known example, however, when the lower electrode 18 exists in the portions overlapping with the ends 20c of the slit-shaped openings 20 of the upper electrode 21 in plan view, the direction of the electric field gradually varies by 180° between one long side 20a and the other long side 20b of each of the slit-shaped openings 20. Therefore, the alignment direction of the liquid crystal molecules 30a horizontally rotates either rightward or leftward. However, in the liquid crystal display panel 10 according to the first embodiment, the liquid crystal molecules are not driven in the areas 22 where the lower electrode 18 does not exist, even when the driving voltage is applied between the upper electrode 21 and the lower electrode 18. Accordingly, it is difficult for a reverse twist domain occurring in the known example to occur. Moreover, even when reverse twist occurs in the liquid crystal display panel 10a according to the first embodiment, a domain in an original twist direction is suppressed, thereby considerably reducing the reverse twist domain.

Under the assumption that an angle direction of an acute angle formed between a longitudinal direction of the slit-shaped openings 20 and the rubbing direction is positive (see FIG. 4A) when the driving voltage is applied between the upper electrode 21 and the lower electrode 18, the liquid crystal molecules 20a horizontally rotate with ease either rightward or leftward at locations where an acute angle φ formed between the boundary direction of the slit-shaped openings 20 and the rubbing direction Y is negative. Therefore, it is easy for abnormal alignment to occur. In order to solve this problem, in the liquid crystal display panel 10A according to the first embodiment, the areas 22, where the lower electrode 18 does not exist, formed in the lower electrode 18 include the locations where an acute angle φ formed between the boundary direction of the ends 20c of slit-shaped openings 20 of the upper electrode 21 and the rubbing direction Y is negative. When the areas 22 where the lower electrode 18 does not exist are formed at the locations, the areas 22 where the light from the backlight unit is not transmitted and the lower electrode 18 does not exist can be miniaturized only in areas where the abnormal alignment easily occurs. Accordingly, it is possible to obtain the liquid crystal display panel 10A capable of brighter display.

In the known FFS mode liquid crystal display panel, since the ends 20c of the slit-shaped openings 20 of the upper electrode 18 are shielded by the light-shielding film 26, the area of shielded portions is large and aperture ratio is considerably reduced. However, in the liquid crystal display panel 10A according to the first embodiment, it is not necessary to shield the ends 20c of the slit-shaped opening 20 of the upper electrode 18, since the light from the backlight unit is not transmitted in the portions of the areas 22 where the lower electrode 18 does not exist in the lower electrode 18. Accordingly, it is possible to considerably improve the aperture ratio. According to the liquid crystal display panel 10A described in the first embodiment, it is possible to obtain the FFS mode liquid crystal display panel capable of achieving a large aperture ratio and a good characteristic obtained upon applying a force to a surface.

In the first embodiment, the slit-shaped openings 20 formed in the upper electrode 21 are tilted with respect to the scanning lines 12 and the signal lines 13. However, the slit-shaped openings 20 may be formed along the scanning lines 12 or the signal lines 13.

Second Embodiment

Next, a liquid crystal display panel 10B will be described with reference to FIGS. 5 to 7 according to a second embodiment. In FIGS. 5 to 7, the same reference numerals are given to the same constituent elements as those in the liquid crystal display panel 10A shown in FIGS. 1 to 3 according to the first embodiment, and the detailed description is omitted.

Different points of the liquid crystal display panel 10B according to the second embodiment from the liquid crystal display panel 10A according to the first embodiment are that (1) slit-shaped openings 20 formed in an upper electrode 21 are formed along a signal line 13, (2) openings 22 of the lower electrode 18 formed in ends 20c of the slit-shaped openings 20 are formed as notches a part of which are opened, and (3) the upper electrode 21 operates as a pixel electrode and the lower electrode 18 operates as a counter electrode.

That is, in the liquid crystal display panel 10B according to the second embodiment, the upper electrode 21 includes the plurality of slit-shaped openings 20 extending along the signal line 13 and the ends 20c of the slit-shaped opening 20 are formed at an acute angle. The upper electrode 21 is electrically connected to a drain electrode D of a TFT through a contact hole 17. The lower electrode 18 is formed below the upper electrode 21 with an insulation film 19 interposed therebetween. In the lower electrode 18, notches 22a a part of which are opened are formed at locations where the ends 20c of the slit-shaped openings 20 formed in the upper electrode 21 overlap with the lower electrode 18 in plan view. Accordingly, the circumference shape of the lower electrode 18 is convex and concave since the notches 22a are formed. The lower electrode 18 is formed entirely on the surface of a flattened film 16 and bypasses a TFT formation portion and a contact hole 17 to be connected to a common line formed in the circumference of a display area (not shown).

The lower electrode 18 is formed by forming a film made of a transparent conductive material such as ITO or IZO on the surface of the flattened film 16 and performing a photolithographic method. A method of extending the notches 22a a part of which are opened from the outer circumference of the lower electrode 18 is better than a method of forming openings with a closed circumference within the lower electrode 18, since tolerance of a mask location is larger. In this way, it is possible to easily form the notches 22a a part of which are opened in the circumference of the lower electrode 18. Moreover, the slit-shaped openings 20 of the upper electrode 21 are formed by forming a film made of a transparent conductive material such as ITO or IZO on the surface of the insulation film 19 and performing a photolithographic method. Since the flexibility of mask alignment for positioning the ends 20C of the slit-shaped openings 20 of the upper electrode 21 which are formed at an acute angle within the notches 22a formed in the circumference of the lower electrode 18 in plan view is larger, easy manufacture is possible. Moreover, when the ends 20c of the slit-shaped openings 20 of the upper electrode 21 are formed at the acute angle, the ends 20c formed at the acute angle become a base point of the reverse twist domain, and since the reverse twist domain can be made smaller, it is possible to reduce an influence on a display image quality.

In the second embodiment, the slit-shaped openings 20 formed in the upper electrode 21 are formed along the signal line 13, but may be formed along a scanning line 12 or in an inclination direction with respect to the scanning line 12 or the signal line 13.

Third Embodiment

Next, a liquid crystal display panel 10C will be described with reference to FIGS. 8 to 10 according to a third embodiment. In FIGS. 8 to 10, the same reference numerals are given to the same constituent elements as those in the liquid crystal display panel 10A shown in FIGS. 1 to 3 according to the first embodiment, and the detailed description is omitted.

Different points of the liquid crystal display panel 10C according to the third embodiment from the liquid crystal display panel 10A according to the first embodiment are that (1) one sides of slit-shaped openings 20 formed in the upper electrode 21 are formed in a notched open shape and (2) openings 22 of the lower electrode 18 formed in ends 20c of the slit-shaped openings 20 are formed in one side.

That is, in the liquid crystal display panel 10C according to the third embodiment, the slit-shaped openings 20 formed in the upper electrode 21 have a shape tilted with respect to the scanning line 12 and the signal line 13, like the liquid crystal display panel 10A according to the first embodiment. One-side ends of the slit-shaped openings 20 have the notched open shape and no opening of the lower electrode 18 is formed in the ends. Instead, the openings 22 of the lower electrode 18 are formed only in one-side ends 20c of the slit-shaped openings 20 formed in a closed shape. The reason for adopting this configuration is that no reverse twist domain occurs since the boundary of the slit-shaped openings 20 parallel to the rubbing direction does not exist in the one-side ends in which the slit-shaped openings 20 are notched.

According to the liquid crystal display panel 10C described in the third embodiment, it is possible to effectively prevent the reverse twist domain from occurring, since the openings 22 of the lower electrode 18 are formed in the one-side ends 20c of the slit-shaped openings 20 formed in the closed shape. Moreover, according to the liquid crystal display panel 10C described in the third embodiment, it is possible to achieve a display more bright than that of the liquid crystal display panel 10A according to the first embodiment, since the one-side of the slit-shaped openings 20 having the notched open shape allow light from the backlight unit to be transmitted.

In the third embodiment, the slit-shaped openings 20 formed in the upper electrode 21 are formed in the tilted direction with respect to the scanning line 12 and the signal line 13, but may be formed along the scanning line 12 or the signal line 13 as long as the notched open shape are formed in the one-side ends of the slit-shaped openings 20.

In the first to third embodiments, the lower electrodes 18 are formed on the surface of the flattened film 16. However, the flattened film may not be formed and the lower electrode 18 may be formed directly on the surface of the first transparent substrate 11. However, when a flattened film is formed in every pixel, each electrode formed on the surface of the flattened film is flattened since the unevenness caused due to a switching element or the like is uniformly flattened and thus a cell gap is uniformed. Accordingly, it is possible to obtain a liquid crystal display panel having a good display image quality.

The entire disclosure of Japanese Patent Application No. 2008-028478, filed Feb. 8, 2008 is expressly incorporated by reference herein.

What is claimed is:

1. A liquid crystal display panel, comprising:
   a pair of substrates opposed to each other;
   a liquid crystal layer interposed between said pair of substrates;
   a plurality of pixel areas formed in one of the pair of substrates, each of the pixel areas provided with an upper electrode having a plurality of elongated slit-shaped openings, and a lower electrode having no elongated slit-shaped openings formed below the upper electrode;
   an insulation layer; and
   an alignment film;
   wherein a longitudinal direction of the plurality of slit-shaped openings and a rubbing direction of the alignment film form a predetermined angle therebetween, and
   wherein circle-shaped areas where the lower electrode does not exist are formed in portions of the lower electrode that overlap with ends of the elongated slit-shaped openings of the upper electrode.

2. The liquid crystal display panel according to claim 1, wherein under the assumption that an angle direction of an acute angle formed between the longitudinal direction of the slit-shaped opening and the rubbing direction is positive, the areas where the lower electrode does not exist are located in portions in which an angle $\phi$ (where $0°\leq|\phi|\leq 90°$ formed between a boundary direction of the slit-shaped opening and the rubbing direction is negative.

3. The liquid crystal display panel according to claim 1, wherein the areas where the lower electrode does not exist are formed as notches formed in side edges of the lower electrode.

4. The liquid crystal display panel according to claim 1, where the areas where the lower electrode does not exist are formed as openings in the lower electrode.

5. The liquid crystal display panel according to claim 1, wherein the longitudinal ends of the slit-shaped openings of the upper electrode are formed at an acute angle.

6. The liquid crystal display panel according to claim 1, wherein the lower electrode is formed on the surface of a flattened film formed in each of the pixels.

* * * * *